(12) United States Patent
Correa, Jr. et al.

(10) Patent No.: US 12,248,146 B1
(45) Date of Patent: Mar. 11, 2025

(54) SYSTEM AND METHOD FOR MONITORING HEAD-UP DISPLAY (HUD) FOR MALFUNCTION

(71) Applicant: Rockwell Collins, Inc., Cedar Rapids, IA (US)

(72) Inventors: Ramon Correa, Jr., Newberg, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/439,105

(22) Filed: Feb. 12, 2024

(51) Int. Cl.
*G02B 27/01* (2006.01)
*G06F 3/01* (2006.01)
*G06T 7/00* (2017.01)

(52) U.S. Cl.
CPC ..... *G02B 27/0101* (2013.01); *G02B 27/0179* (2013.01); *G06F 3/012* (2013.01); *G06F 3/013* (2013.01); *G06T 7/0002* (2013.01); *G02B 2027/0187* (2013.01); *G06T 2207/10048* (2013.01); *G06T 2207/30168* (2013.01); *G06T 2207/30201* (2013.01); *G06T 2207/30268* (2013.01)

(58) Field of Classification Search
CPC ............ G02B 27/0101; G02B 27/0179; G02B 2027/0187; G06F 3/012; G06F 3/013; G06T 7/0002; G06T 2207/10048; G06T 2207/30168; G06T 2207/30201; G06T 2207/30268
See application file for complete search history.

(56) References Cited

U.S. PATENT DOCUMENTS

| | | | |
|---|---|---|---|
| 7,355,179 B1 * | 4/2008 | Wood | G06T 7/001 250/339.11 |
| 8,248,454 B2 | 8/2012 | Thielman | |
| 8,699,781 B1 | 4/2014 | Bold | |
| 9,847,047 B2 | 12/2017 | Wu et al. | |
| 9,891,705 B1 | 2/2018 | Lahr et al. | |
| 10,109,054 B1 | 10/2018 | Wilson et al. | |
| 10,606,079 B1 | 3/2020 | Keith | |
| 10,769,053 B2 | 9/2020 | Thangaraj et al. | |
| 11,176,858 B2 | 11/2021 | Mills et al. | |
| 11,733,522 B2 | 8/2023 | Stratton et al. | |
| 2016/0025973 A1 * | 1/2016 | Guttag | G06F 3/017 345/7 |
| 2016/0291222 A1 | 10/2016 | Vermeirsch et al. | |
| 2019/0075290 A1 | 3/2019 | Dubey et al. | |

(Continued)

FOREIGN PATENT DOCUMENTS

| | | |
|---|---|---|
| EP | 4152738 A1 | 3/2023 |
| WO | 2019092413 A1 | 5/2019 |

*Primary Examiner* — Nitin Patel
*Assistant Examiner* — Cory A Almeida
(74) *Attorney, Agent, or Firm* — Suiter Swantz IP

(57) ABSTRACT

A system includes a head-up display (HUD) system including a display; a combiner; and at least one processor communicatively coupled to at least one image sensor of at least one tracking system and to the display. The at least one processor configured to: receive image data from one or more of the at least one image sensor, wherein the image data is (i) for performing eye tracking and/or head tracking operations and (ii) for monitoring the displayed images; and detect the at least one malfunction of the HUD system.

18 Claims, 8 Drawing Sheets

(56) References Cited

U.S. PATENT DOCUMENTS

| | | |
|---|---|---|
| 2019/0253603 A1 | 8/2019 | Miyagaki et al. |
| 2020/0177807 A1 | 6/2020 | Kurihara et al. |
| 2022/0258882 A1 | 8/2022 | Lajiness et al. |
| 2022/0404624 A1 | 12/2022 | Shahal et al. |
| 2023/0377536 A1* | 11/2023 | Kalinowski ............ H04N 23/57 |

* cited by examiner

SYSTEM AND METHOD FOR MONITORING HEAD-UP DISPLAY (HUD) FOR MALFUNCTION

BACKGROUND

Currently, head-up displays (HUDs) for aircraft have a limited number of techniques for monitoring for HUD malfunctions, which in turn can limit a design assurance level (DAL) of a HUD.

SUMMARY

In one aspect, embodiments of the inventive concepts disclosed herein are directed to a system. The system may include a head-up display (HUD). The HUD system may include: a display configured to display images as displayed images; a combiner configured to receive the displayed images from the display and to display the displayed images as combiner images to a user; and at least one processor. One or more of the at least one processor communicatively coupled to at least one image sensor of at least one tracking system and to the display. The at least one processor may be configured to: output display image data to the display, the display image data associated with the displayed images to be displayed by the display and to be received by the combiner; receive image data from one or more of the at least one image sensor, wherein the image data is (i) for performing eye tracking and/or head tracking operations and (ii) for monitoring the displayed images; monitor the displayed images for at least one malfunction, the at least one malfunction comprising at least one occurrence of: at least one symbol misalignment, at least one HUD system failure, or at least one combiner misalignment; detect the at least one malfunction; and upon a detection of the at least one malfunction, at least one of (a) cause one or more of the displayed images to be blank, have at least one blank portion, and/or have at least one blanked symbol, (b) correct the display image data based at least on a position of the combiner and/or a position of the user, (c) cease the output of the display image data, or (d) deactivate the display.

In a further aspect, embodiments of the inventive concepts disclosed herein are directed to a method. The method may include: displaying, by a display of a head-up display (HUD) system, display images as displayed images, wherein HUD system comprises the display, a combiner, and at least one processor, wherein one or more of the at least one processor are communicatively coupled to at least one image sensor of at least one tracking system and to the display; receiving, by the combiner, the displayed images from the display; displaying, by the combiner, the displayed images as combiner images to a user; outputting, by the at least one processor, display image data to the display, the display image data associated with the displayed images to be displayed by the display and to be received by the combiner; receiving, by the at least one processor, image data from one or more of the at least one image sensor, wherein the image data is (i) for performing eye tracking and/or head tracking operations and (ii) for monitoring the displayed images; monitoring, by the at least one processor, the displayed images for at least one malfunction, the at least one malfunction comprising at least one occurrence of: at least one symbol misalignment, at least one HUD system failure, or at least one combiner misalignment; detecting, by the at least one processor, the at least one malfunction; and upon a detection of the at least one malfunction, at least one of (a) causing, by the at least one processor, one or more of the displayed images to be blank, have at least one blank portion, and/or have at least one blanked symbol, (b) correcting, by the at least one processor, the display image data based at least on a position of the combiner and/or a position of the user, (c) ceasing, by the at least one processor, the output of the display image data, or (d) deactivating, by the at least one processor, the display.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
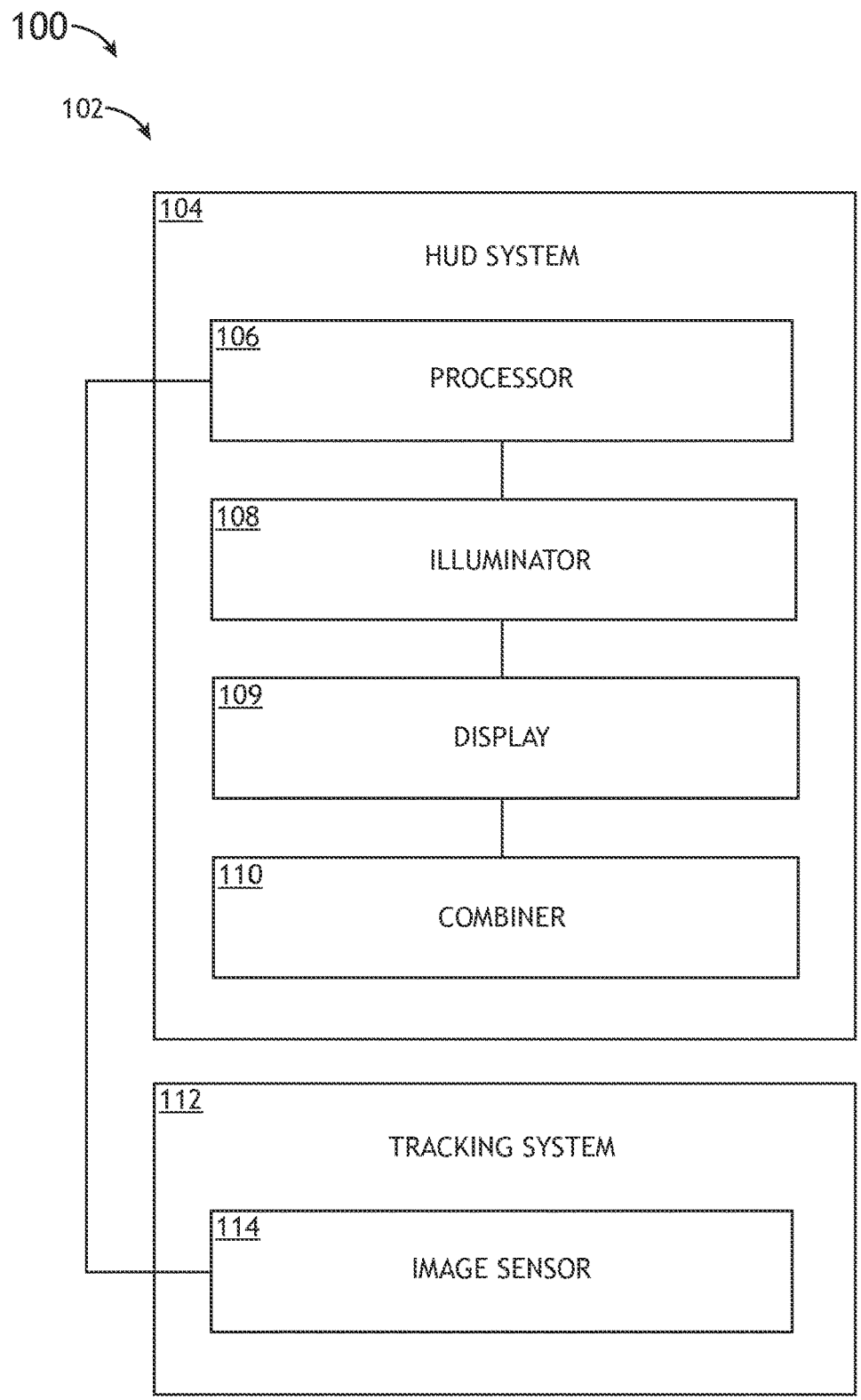
FIG. 1A is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and system including a head-up display (HUD) system and at least one image sensor of at least one tracking system, wherein at least one processor may be configured to: receive image data from one or more of the at least one image sensor, the image data being (i) for performing eye tracking and/or head tracking operations and (ii) for monitoring displayed images displayed by a display of the HUD system; and detect at least one malfunction of the HUD system.

Next generation HUDs may be regulated to have monitoring techniques that provide a higher (e.g., than existing) Design Assurance Level (DAL), which may include monitoring of combiner alignment and display of misleading information. For example, an eye tracking camera may be used as a monitor to provide a high DAL for safety monitoring applications, which may require monitoring of the camera for failures.

Some embodiments include using at least one image sensor (e.g., at least one infrared (IR), invisible, and/or visible spectrum sensor; e.g., camera (e.g., a visible spectrum and/or IR camera)) of at least one tracking system (e.g., at least one eye tracking system and/or at least one head tracking system), which may be compatible with night vision imaging system (NVIS) compatible HUDs or non-NVIS compatible HUDS, as a multifunction high Design Assurance Level (DAL) monitor, which may increase safety and/or reduce cost of HUD solutions.

Some embodiments may monitor for symbol misalignment, display failures (of a HUD), and/or combiner misalignment.

For example, with respect to monitoring for symbol misalignment, an eye tracking system camera may provide a video stream to a processor (e.g. of a HUD computing device and/or a HUD display) that processes the video stream to monitor individual symbol position. For example, if an error is detected, such processor may blank the display and/or remove the symbol(s).

For example, with respect to monitoring for display failures, an eye tracking system camera may provide a video stream to a processor (e.g. of a HUD computing device and/or a HUD display) that processes the video stream to monitor the HUD display for frozen and/or flipped images. For example, if an error is detected, such processor may command a blanking of the HUD display.

For example, with respect to monitoring for combiner misalignment, the eye tracking system camera may provide the video stream to a processor (e.g. of a HUD computing device and/or a HUD display) that processes the video stream to calculate a combiner position. For example, such processor may use the combiner position to actively correct for the combiner position.

In some embodiments, IR light emitting diodes (LEDs) may be positioned in the cockpit and/or cockpit features may be captured and/or detected a tracking system (e.g., an eye tracking system and/or a head tracking system), and an IR image sensor (e.g., e.g., IR camera) may provide a video stream to a processor (e.g. of a HUD computing device and/or a HUD display). Such processor may process the video stream to determine that the IR image sensor has not failed, such as by comparing the video stream with known existing position(s) of the IR LEDs and/or the cockpit features.

In some embodiments, one process of combiner alignment monitoring and/or detection may verify (e.g., with a combiner alignment detector (CAD)) correct angular alignment of a combiner with respect to an aircraft boresight. For example, CAD may use an IR emitter, a reflective mirror, and a photodiode IR detector to determine if the combiner is aligned or misaligned. When the combiner is in the aligned position the IR spot is more or less centered on the detector. When the combiner is misaligned, either toward breakaway or stow positions, the IR spot will move up or down on the detector.

In some embodiments, one process of display failure monitoring and/or detection may verify an integrity of timing controller (TCON) functionality by utilizing results of monitoring performed by both a main and monitor partitions of a processor (e.g., a field-programmable gate array (FPGA)) associated with the TCON. For example, a TCON monitor may exist in a partitioned portion of such FPGA. For example, TCON and/or active-matrix liquid crystal display (AMLCD) failures that could result in a frozen or flipped display image may be reported to an LCD controller board on a dedicated bus from the TCON FPGA monitor partition. Other failures may be reported to the LCD controller board, such as on a separate bus from the TCON FPGA main partition.

In some embodiments, one process of display failure monitoring and/or detection may include monitoring an illuminator of a HUD. The illuminator may be constructed from a single LED. For example, an LED fail bit may indicate and/or monitor a state of the LED to determine if current is flowing through the LED. A fault will be used to notify the maintenance personnel that the illuminator should be replaced. The overhead unit (OHU) may not automatically disable the illuminator when such fault is detected; however, software executed by a processor may command a blank display. When the illuminator is disabled (e.g., as commanded by Software), the OHU liquid crystal display controller (LCDC) FPGA design may deassert certain faults that cause the LED fail bit. Also, latching may be employed to avoid a display on/off race condition from persisting.

Some embodiments may include a process of monitoring misleading symbology and/or detection thereof. For example, a critical symbol monitor (CSM) bit may verify an integrity of a HUD display path and prevent a display of misleading symbology as a result of improper positioning.

Referring now to FIGS. 1A-6, exemplary embodiment of a system 100 according to the inventive concepts disclosed herein is depicted. In some embodiments, the system 100 may include at least one vehicle 116 (e.g., at least one automobile, at least one train, at least one watercraft, at least one spacecraft, or at least one aircraft 102 (e.g., at least one helicopter and/or at least one airplane)), some or all of which may be communicatively coupled at any given time. In some embodiments, the vehicle (e.g., aircraft 102) may include an HUD system 104 (e.g., as a HUD, as shown in FIG. 1A; including a HUD 106 and at least one tracking system 112 (e.g., at least one head tracking system 112A and/or at least one eye tracking system 112B), as shown in FIG. 1B). While the system 100 is exemplarily shown as the vehicle (e.g., the aircraft 102), which includes the HUD system 104 (e.g., including or lacking some or all of an integrated tracking system 112) and/or a tracking system 112 (e.g., a separate tracking system), in other embodiments, the HUD system 104 and/or a tracking system 112 (e.g., a separate tracking system) may be installed in any suitable vehicular or non-vehicular system; for example, the system may be implemented as a wearable system, such as head wearable system (e.g., a helmet (e.g., an aircraft helmet, spacesuit helmet, automobile helmet, soldier (e.g., infantry or artillery) helmet, or construction helmet)) including the HUD system 104.

Figure 1B:
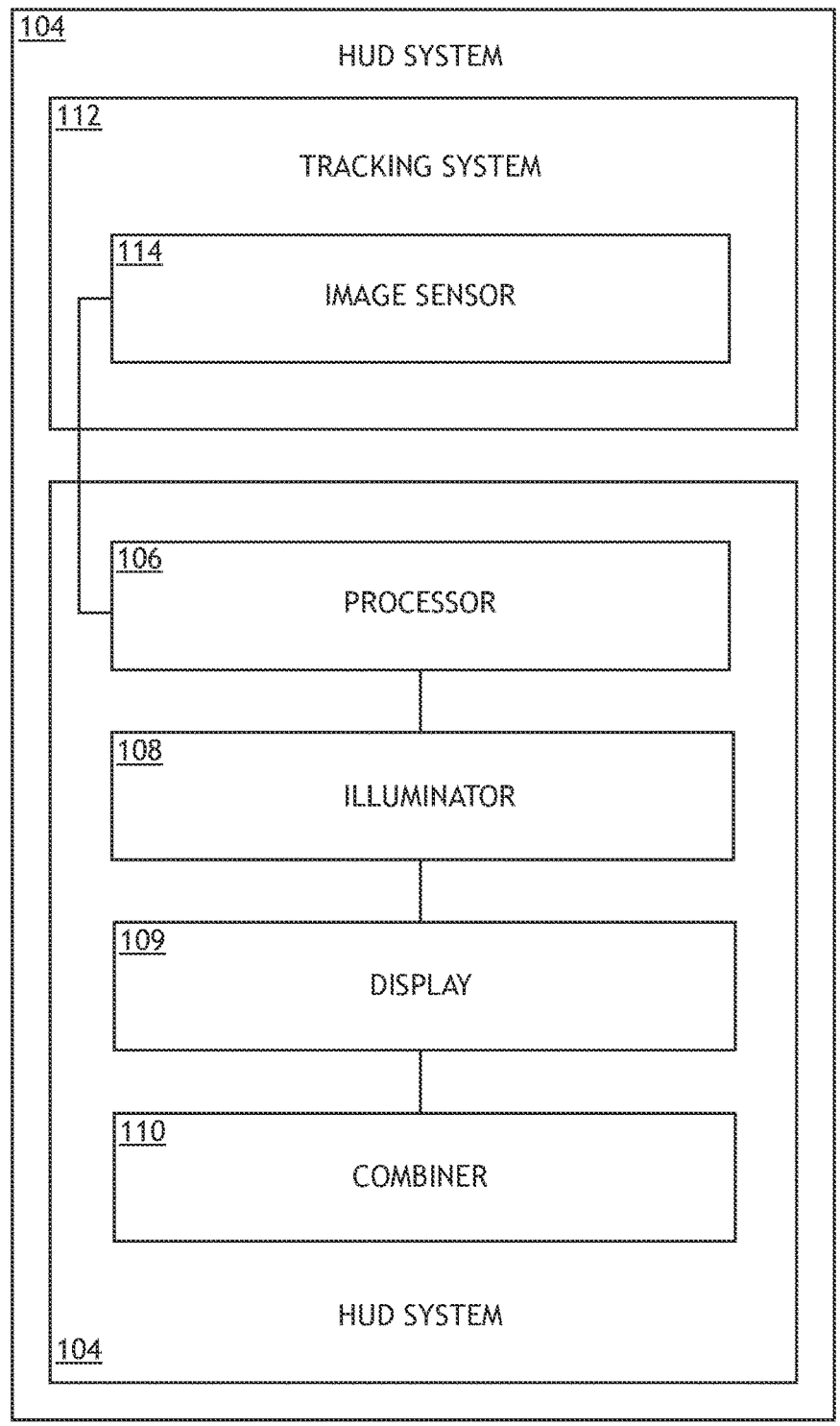
FIG. 1B is a view of an exemplary embodiment of the system of FIG. 1A according to the inventive concepts disclosed herein.
Figure 4:
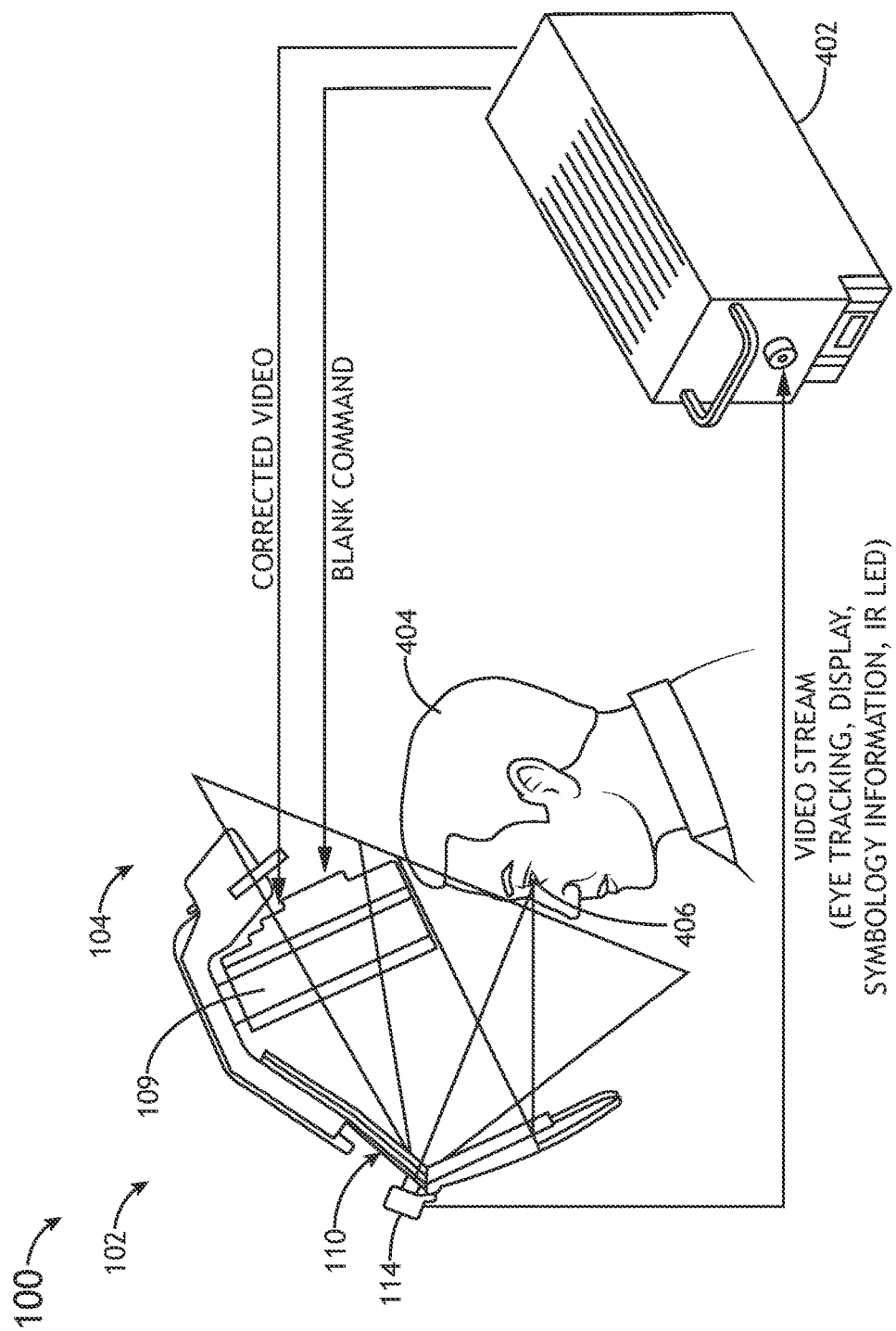
FIGS. 4 and 5 are exemplary views of the HUD system of FIGS. 1A-1B according to the inventive concepts disclosed herein.
Figure 5:
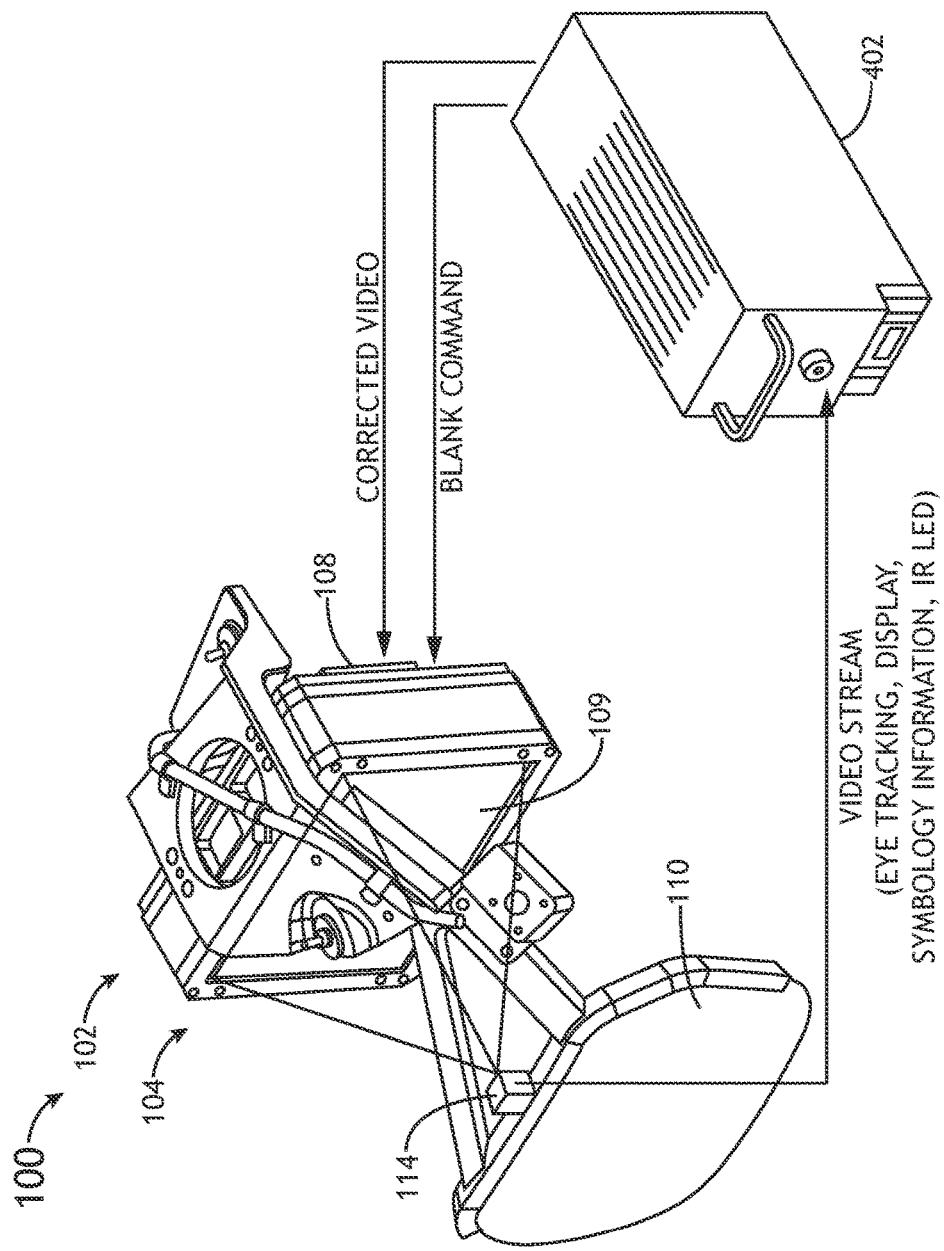

As exemplarily shown in FIGS. 1A and 1B, the HUD system 104 may include the HUD 116, at least one processor 106 (e.g., at least one HUD display processor associated with the display 109 and/or at least one other processor of the HUD system 104 (e.g., of at least one computing device (e.g., 402 (e.g., a HUD computing device), such as shown in FIGS. 4-5))), at least one illuminator 108, at least one display 109, at least one combiner 110, and/or at least a portion (e.g., some or all; e.g., at least one image sensor 114) of at least one tracking system 112, some or all of which may be communicatively and/or optically coupled at any given time.

For example, as shown in FIG. 1A, the aircraft 102 may include the HUD system 104 and/or the at least one tracking system 112, and the HUD system 104 may include the at least one processor 106, the at least one illuminator 108, the at least one display 109, and/or the at least one combiner 110.

For example, as shown in FIG. 1B, the aircraft 102 may include the HUD system 104. The HUD system 104 may include the at least one processor 106, at least one illuminator 108, the at least one display 109, the at least one combiner 110, and/or the at least one tracking system 112.

Referring generally to FIGS. 1A-1B, the illuminator 108 may be any suitable light source configured to illuminate the at least one display 109. For example, the at least one illuminator may be at least one light emitting diode (LED) (e.g., a single LED). In some embodiments, the illuminator 108 may be omitted, such as if the display 109 is an emissive display, such as an LED-based display.

Referring generally to FIGS. 1A-1B, the display 109 may be any suitable display configured to transmit and/or emit light. For example, display may be a transmissive display (e.g., a liquid crystal display (LCD)) and/or an emissive display (e.g., an LED display). For example, the display 109 may be configured to display images as displayed images.

Referring generally to FIGS. 1A-1B, the at least one combiner 110 may be any suitable combiner. For example, the combiner 110 may be configured to receive the displayed images from the display 109 and to display the displayed images as combiner images to a user (e.g., 404), such as a vehicle operator or pilot.

Referring generally to FIGS. 1A-1B, the at least one image sensor 114 of the at least one tracking system 112 (e.g., at least one head tracking system 112A, at least one eye tracking system 112B, or some combination thereof) may be any suitable image sensor(s), such as a camera, configured to capture light over any suitable spectrum range (e.g., IR, invisible, and/or visible spectrums). For example, one or more of the at least one image sensor 114 may be configured to output (e.g., collectively output if more than one image senor of a single tracking system 112 or of multiple tracking systems 112) image data, wherein the image data is (i) for performing eye tracking and/or head tracking operations and (ii) for monitoring the displayed images. In some embodiments, one or more of the at least one image sensor 114 of the at least one tracking system 112 may be communicatively coupled to the at least one processor 106 via at least one bus (e.g., at least one dedicated bus (e.g., shown as a line connecting the processor 106 and the image sensor in FIGS. 1A and 1B) and/or at least one shared bus). In some embodiments, the one or more of the at least one image sensor 114 may be positioned on or in the HUD system 104; in other embodiments, the at least one image sensor 114 may be positioned at any suitable location(s) configured to have a field of view (FOV) or FOVs including (a) at least one eye (e.g., 406, shown in FIG. 4) of the user (e.g., 404, shown in FIGS. 4 and 6) when at least one boresight (e.g., a vehicle boresight, such as an aircraft boresight 604, shown in FIG. 6) extends from the at least one eye (e.g., 406) of the user (e.g., 404) through the combiner 110 and further through the windshield (e.g., 602, shown in FIG. 6) of the cockpit (e.g., a vehicle cockpit, such as an aircraft cockpit 606, shown in FIG. 6) of the vehicle, (b) the display 109, and/or (c) at least one reference light source (e.g., 608, shown in FIG. 6), at least one reference fiducial (e.g., paint marking(s) and/or sticker(s) positioned at a specific position(s); e.g., 610, shown in FIG. 6), and/or at least one cockpit feature (e.g., 612, shown in FIG. 6, such as a seat, electronics panel, display, headrest, door, wall, ceiling, and/or monument).

Referring generally to FIGS. 1A-6, the at least one processor (e.g., at least one processor 106, at least one processor 204, and/or at least one processor 306) may be any suitable processor or combination of processors, such as at least one HUD display processor associated with the display 109, at least one other processor of the HUD system 104 (e.g., of at least one computing device (e.g., 402 (e.g., a HUD computing device), such as shown in FIGS. 4-5)), and/or at least one processor (e.g., at least one processor 204 and/or at least one processor 306) of the at least one tracking system 112 (e.g., the at least one head tracking system 112A, the at least one eye tracking system 112B, or some combination thereof) configured (e.g., collectively configured, if more than one processor and/or if multiple processors are distributed among multiple devices) to perform any or all of the operations disclosed throughout. For example, the at least one processor (e.g., at least one processor 106, at least one processor 204, and/or at least one processor 306) may include at least one central processing unit (CPU), at least one graphics processing unit (GPU), at least one field-programmable gate array (FPGA), at least one application specific integrated circuit (ASIC), at least one digital signal processor, at least one image processor, at least one deep learning processor unit (DPU), at least one virtual machine (VM) running on at least one processor, and/or the like configured to perform (e.g., collectively perform) any of the operations disclosed throughout.

Figure 6:
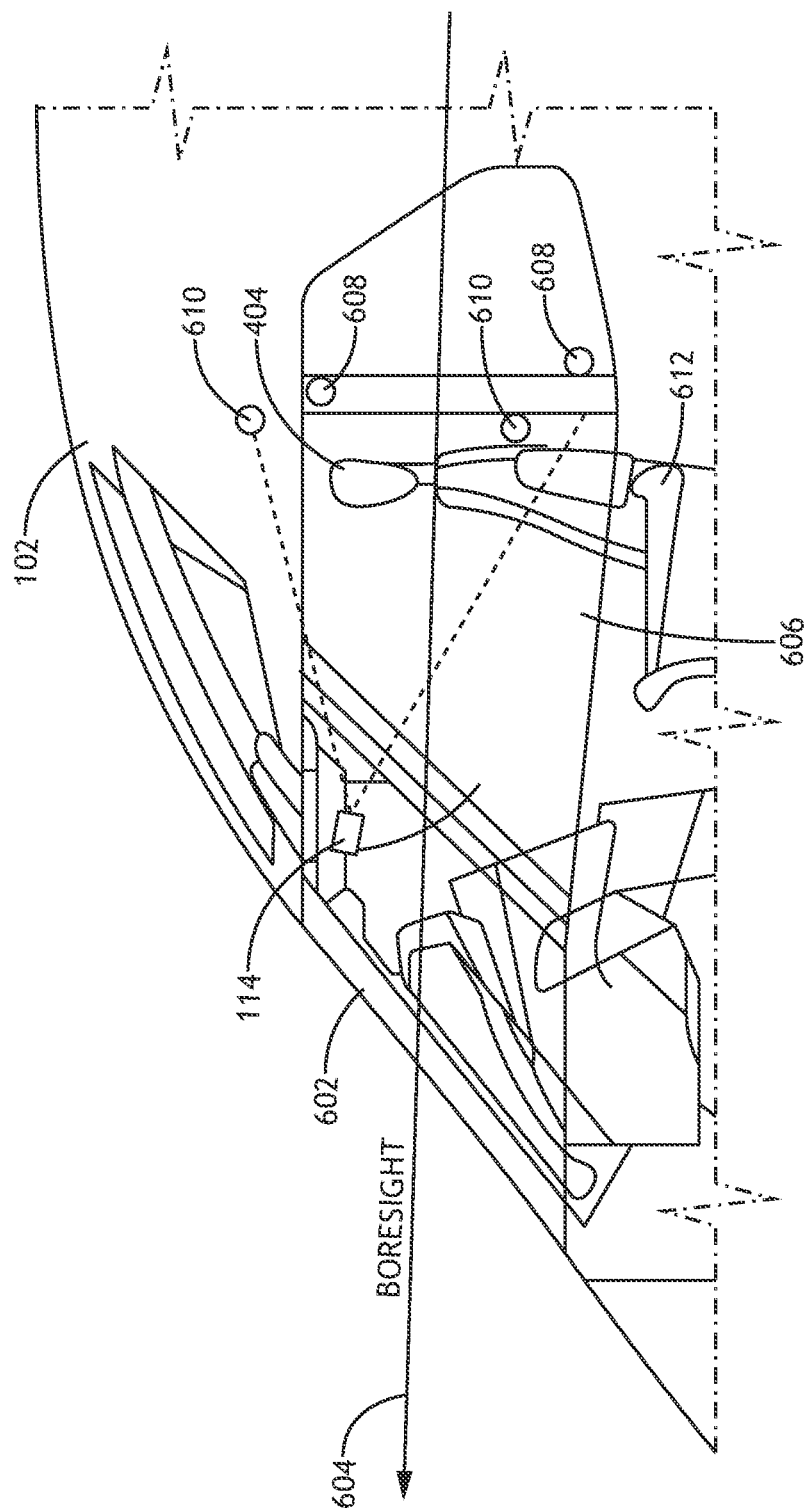
FIG. 6 is a view of the exemplary aircraft of FIGS. 1A, 1B, 4, and 5 according to the inventive concepts disclosed herein.

For example, the at least one processor 106 may include at least one central processing unit (CPU), at least one graphics processing unit (GPU), at least one field-programmable gate array (FPGA), at least one application specific integrated circuit (ASIC), at least one digital signal processor, at least one image processor, at least one deep learning processor unit (DPU), at least one virtual machine (VM) running on at least one processor, and/or the like configured to perform (e.g., collectively perform) any of the operations disclosed throughout. For example, the at least one processor 106 may include a CPU and a GPU configured to perform (e.g., collectively perform) any of the operations disclosed throughout. For example, the at least one processor 106 may include at least one FPGA configured to perform (e.g., collectively perform) any of the operations disclosed throughout. The processor 106 may be configured to run various software applications or computer code stored (e.g., maintained) in a non-transitory computer-readable medium (e.g., memory and/or storage) and configured to execute various instructions or operations. For example, the processor 106 may be configured to: output display image data to the display 109, the display image data associated with the displayed images to be displayed by the display 109 and to be received by the combiner 110; receive image data from one or more of the at least one image sensor 114, wherein the image data is (i) for performing eye tracking and/or head tracking operations and (ii) for monitoring the displayed images; monitor the displayed images for at least one malfunction, the at least one malfunction comprising at least one occurrence of: at least one symbol misalignment, at least one HUD system failure, or at least one combiner misalignment; detect the at least one malfunction; upon a detection of the at least one malfunction, at least one of (a) cause one or more of the displayed images to be blank, have at least one blank portion, and/or have at least one blanked symbol, (b) correct the display image data based at least on a position of the combiner 110 and/or a position of the user (e.g., 404, as shown in FIGS. 4 and 6), (c) cease the output of the display image data, or (d) deactivate the display 109; and/or determine that the one or more of the at least one image sensor 114 has not failed, such as by comparing the image data with at least one known (e.g., predetermined) position of at least one reference light source (e.g., 608), at least one reference fiducial (e.g., 610), and/or at least one cockpit feature (e.g., 612, such as a seat, electronics panel, display, headrest, door, wall, ceiling, and/or monument).

In some embodiments, the system 100 may include a vehicle (e.g., aircraft 102) comprising a cockpit 606 and the HUD system 104, the cockpit 606 comprising a windshield 602, wherein the one or more of the at least one image sensor 114 is configured to provide the image data to the at least one processor (e.g., at least one processor 106, at least one processor 204, and/or at least one processor 306), wherein each of the one or more of the at least one image sensor 114 is configured to have a field of view including (a) at least one eye 406 of the user 404 when at least one boresight 604 extends from the at least one eye 406 of the user 404 through the combiner 110 and further through the windshield 602 of the cockpit 606 of the vehicle (e.g., the aircraft 102) and (b) the display 109.

In some embodiments, the one or more of the at least one image sensor 114 is at least one infrared (IR) image sensor.

In some embodiments, the one or more of the at least one image sensor 114 is a single image sensor, and the at least one image sensor is the same single image sensor.

In some embodiments, the head-up display (HUD) system 104 is a HUD 116 having the display 109, the at least one processor 106, and the combiner 110.

In some embodiments, the head-up display (HUD) system 104 comprises a computing device 402 and a HUD 116, the computing device 402 having the at least one processor 106, the HUD 116 having the display 109 and the combiner 110.

In some embodiments, the at least one malfunction comprises the at least one occurrence of the at least one symbol misalignment.

In some embodiments, the at least one malfunction comprises the at least one occurrence of the at least one HUD system failure. In some embodiments, the at least one HUD system failure comprises at least one of the displayed images being flipped and/or frozen.

In some embodiments, the at least one malfunction comprises the at least one occurrence of the at least one combiner misalignment. In some embodiments, the at least one processor 106 is further configured to, upon the detection of the at least one malfunction, correct the display image data based at least on the position of the combiner 110 and/or the position of the user 404 (e.g., a position of a head and/or at least one eye 406).

In some embodiments, the at least one processor 106 is further configured to one of (1) monitor the displayed images for the at least one malfunction as a secondary monitoring process separate from a primary process of monitoring for the at least one malfunction or (2) monitor the displayed images for the at least one malfunction as a primary monitoring process separate from a secondary process of monitoring for the at least one malfunction.

Figure 2:
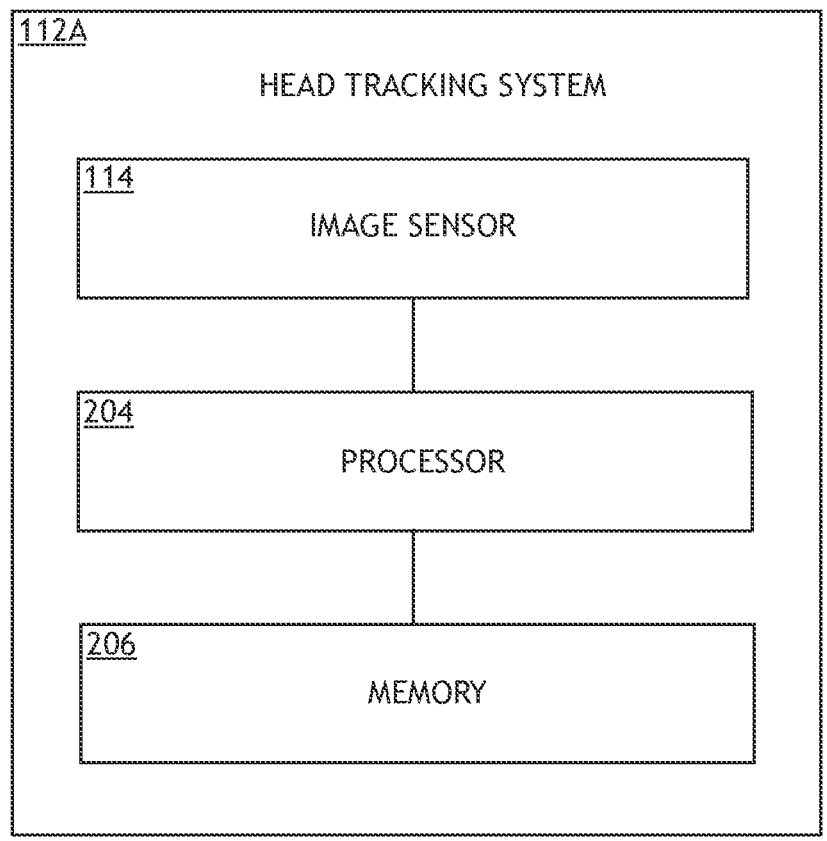
FIG. 2 is a view of an exemplary head tracking system of FIGS. 1A-1B according to the inventive concepts disclosed herein.

Referring now to FIG. 2, the head tracking system 112A may have optical, magnetic, and/or inertial tracking capability. The head tracking system 112A may include at least one sensor (e.g., image sensor 114), at least one processor 204, and at least one memory 206, as well as other components, equipment, and/or devices commonly included in a head tracking system, some or all of which may be communicatively coupled at any time, as shown in FIG. 2. The at least one sensor may be at least one image sensor 114 (e.g., an optical infrared sensor configured to detect infrared light), at least one magnetic sensor, and/or at least one inertial sensor. The head tracking system 112A may be configured to determine and track a position and an orientation of a user's head relative to an environment. The head tracking system 112A may be configured for performing fully automatic head tracking operations in real time. The processor 204 of the head tracking system 112A may be configured to process data received from the sensors (e.g., image sensors 114) and output processed data to one of the computing devices of the system and/or the processor 106 for use in generating images aligned with the user's field of view, such as augmented reality or virtual reality images aligned with the user's field of view to be displayed by the HUD system 104. For example, the processor 204 may be configured to determine and track a position and orientation of a user's head relative to an environment. Additionally, for example, the processor 204 may be configured to generate position and orientation data associated with such determined information and output the generated position and orientation data. The processor 204 may be configured to run various software applications or computer code stored in a non-transitory computer-readable medium (e.g., memory 206) and configured to execute various instructions or operations. The at least one processor 204 may be implemented as a special purpose processor configured to execute instructions for performing (e.g., collectively performing if more than one processor) any or all of the operations disclosed throughout.

Figure 3:
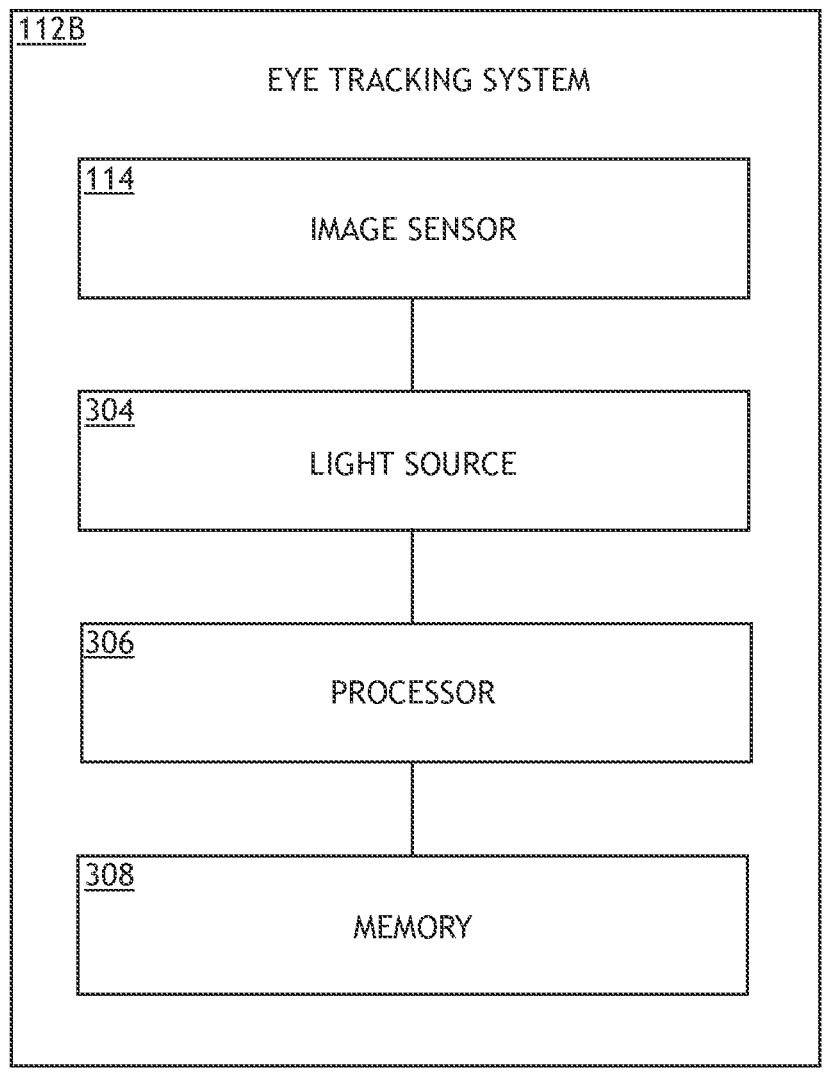
FIG. 3 is a view of an exemplary eye tracking system of FIGS. 1A-1B according to the inventive concepts disclosed herein.

Referring now to FIG. 3, the eye tracking system 112B may include at least one infrared light source (e.g., 302 and/or at least one reference light source (e.g., 608, shown in FIG. 6); e.g., at least one infrared light emitting diode (LED)), at least one image sensor 114 (e.g., at least one IR image sensor), at least one processor 306, and/or at least one memory 308, as well as other components, equipment, and/or devices commonly included in an eye tracking system, some or all of which may be communicatively coupled at any time, as shown in FIG. 3. The eye tracking system 112B may be configured to track eye gestures, track movement of a user's eye, track a user's gaze, and/or otherwise receive inputs from a user's eyes. The eye tracking system 112B may be configured for performing fully automatic eye tracking operations of users in real time.

Figure 7:
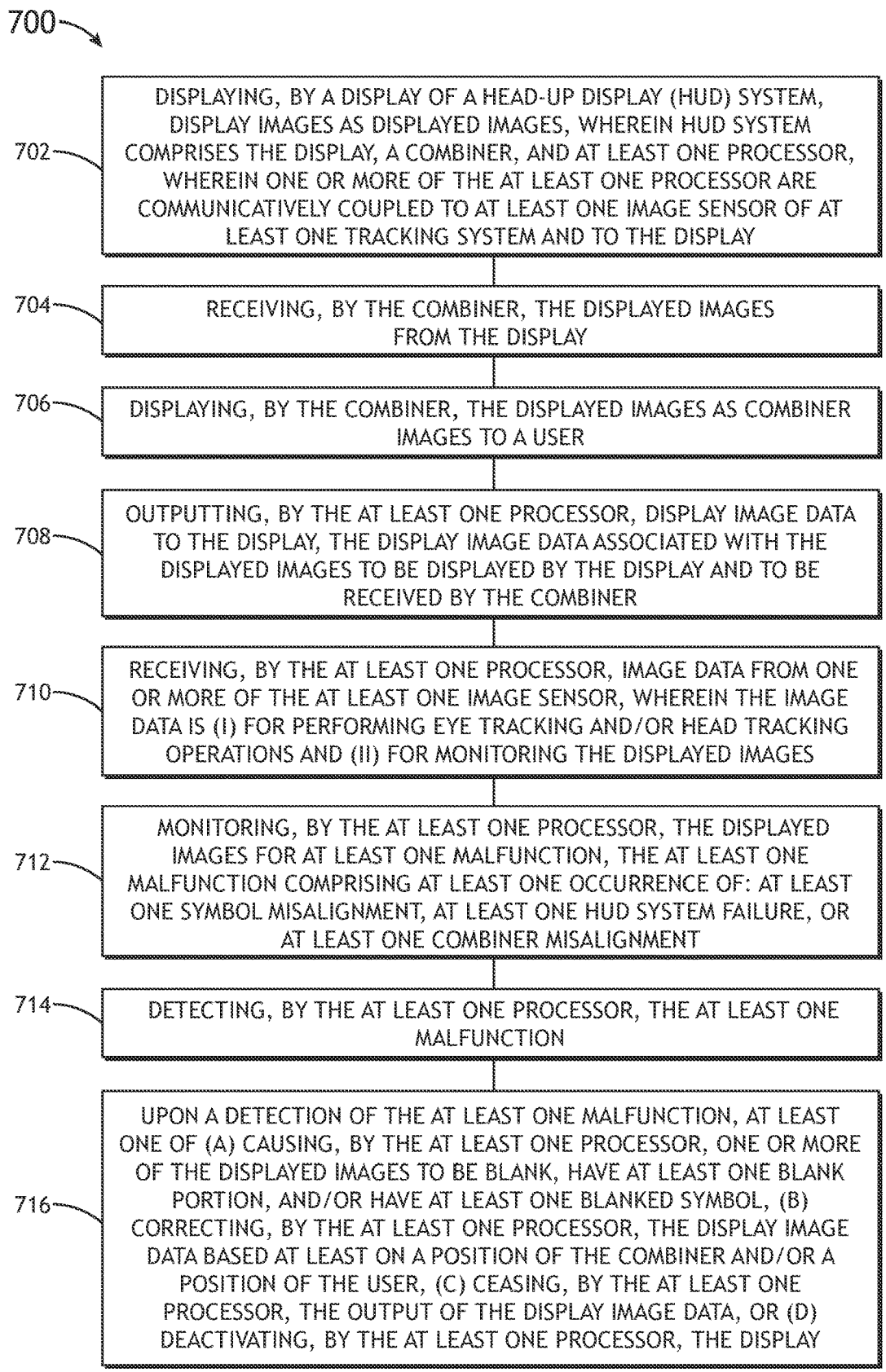
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel, iteratively, and/or concurrently. Additionally, in some embodiments, at least some of the steps of the method 700 may be performed non-sequentially.

A step 702 may include displaying, by a display of a head-up display (HUD) system, display images as displayed images, wherein HUD system comprises the display, a combiner, and at least one processor, wherein one or more of the at least one processor are communicatively coupled to at least one image sensor of at least one tracking system and to the display.

A step 704 may include receiving, by the combiner, the displayed images from the display.

A step 706 may include displaying, by the combiner, the displayed images as combiner images to a user.

A step 708 may include outputting, by the at least one processor, display image data to the display, the display image data associated with the displayed images to be displayed by the display and to be received by the combiner.

A step 710 may include receiving, by the at least one processor, image data from one or more of the at least one image sensor, wherein the image data is (i) for performing eye tracking and/or head tracking operations and (ii) for monitoring the displayed images.

A step 712 may include monitoring, by the at least one processor, the displayed images for at least one malfunction, the at least one malfunction comprising at least one occurrence of: at least one symbol misalignment, at least one HUD system failure, or at least one combiner misalignment.

A step 714 may include detecting, by the at least one processor, the at least one malfunction.

A step 716 may include upon a detection of the at least one malfunction, at least one of (a) causing, by the at least one processor, one or more of the displayed images to be blank, have at least one blank portion, and/or have at least one blanked symbol, (b) correcting, by the at least one processor, the display image data based at least on a position of the combiner and/or a position of the user, (c) ceasing, by the at least one processor, the output of the display image data, or (d) deactivating, by the at least one processor, the display.

Further, the method 700 may include any of the operations disclosed throughout.

Referring generally again to FIGS. 1-7, as will be appreciated from the above, embodiments of the inventive concepts disclosed herein may be directed to a method and system including a head-up display (HUD) system and at least one image sensor of at least one tracking system, wherein at least one processor may be configured to: receive image data from one or more of the at least one image sensor, the image data being (i) for performing eye tracking and/or head tracking operations and (ii) for monitoring displayed images displayed by a display of the HUD system; and detect at least one malfunction of the HUD system.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a head-up display (HUD) system, comprising:
      a display configured to display images as displayed images;
      a combiner configured to receive the displayed images from the display and to display the displayed images as combiner images to a user; and
      at least one processor, one or more of the at least one processor communicatively coupled to at least one image sensor of at least one tracking system and to the display, wherein the one or more of the at least one image sensor is positioned on or in the combiner of the HUD system, wherein one or more of the at least one image sensor is configured to have a field of view including (a) at least one eye of the user when at least one boresight extends from the at least one eye of the user through the combiner and (b) the display, the at least one processor configured to:
         output display image data to the display, the display image data associated with the displayed images to be displayed by the display and to be received by the combiner;
         receive image data from the one or more of the at least one image sensor, wherein the image data is (i) for performing eye tracking and/or head tracking operations and (ii) for monitoring the displayed images;
         monitor the displayed images for at least one malfunction, the at least one malfunction comprising at least one occurrence of: at least one symbol misalignment, at least one HUD system failure, or at least one combiner misalignment;
         detect the at least one malfunction; and
         upon a detection of the at least one malfunction, at least one of (a) cause one or more of the displayed images to be blank, have at least one blank portion, and/or have at least one blanked symbol, (b) correct the display image data based at least on a position of the combiner and/or a position of the user, (c) cease the output of the display image data, or (d) deactivate the display.

2. The system of claim 1, wherein the at least one processor is further configured to: determine that the one or more of the at least one image sensor has not failed by comparing the image data with at least one known position of at least one reference light source, at least one reference fiducial, and/or at least one cockpit feature.

3. The system of claim 1, further comprising the at least one tracking system, the at least one tracking system comprising an eye tracking system, the eye tracking system comprising the at least one image sensor and one or more processors.

4. The system of claim 1, wherein the HUD system further comprises the at least one tracking system, the at least one tracking system comprising an eye tracking system, the eye tracking system comprising the at least one image sensor and at least one of (a) one or more processors or (b) the one or more of the at least one processor.

5. The system of claim 1, further comprising a vehicle comprising a cockpit and the HUD system, the cockpit comprising a windshield, wherein the one or more of the at least one image sensor is configured to provide the image data to the at least one processor, wherein each of the one or more of the at least one image sensor is configured to have the field of view including (a) at least one eye of the user when at least one boresight extends from the at least one eye of the user through the combiner and further through the windshield of the cockpit of the vehicle and (b) the display.

6. The system of claim 1, wherein the one or more of the at least one image sensor is at least one infrared (IR) image sensor.

7. The system of claim 1, wherein the one or more of the at least one image sensor is a single image sensor, wherein the at least one image sensor is the single image sensor.

8. The system of claim 1, wherein the head-up display (HUD) system is a HUD having the display, the at least one processor, and the combiner.

9. The system of claim 1, wherein the head-up display (HUD) system comprises a computing device and a HUD, the computing device having the at least one processor, the HUD having the display and the combiner.

10. The system of claim 1, wherein the at least one malfunction comprises the at least one occurrence of the at least one symbol misalignment.

11. The system of claim 1, wherein the at least one malfunction comprises the at least one occurrence of the at least one HUD system failure.

12. The system of claim 11, wherein the at least one HUD system failure comprises at least one of the displayed images being flipped and/or frozen.

13. The system of claim 1, wherein the at least one malfunction comprises the at least one occurrence of the at least one combiner misalignment.

14. The system of claim 13, wherein the at least one processor is further configured to, upon the detection of the at least one malfunction, correct the display image data based at least on the position of the combiner and/or the position of the user.

15. The system of claim 1, further comprising a vehicle comprising the HUD system.

16. The system of claim 15, wherein the vehicle is an aircraft.

17. The system of claim 1, wherein the at least one processor is further configured to one of (1) monitor the displayed images for the at least one malfunction as a secondary monitoring process separate from a primary process of monitoring for the at least one malfunction or (2) monitor the displayed images for the at least one malfunction as a primary monitoring process separate from a secondary process of monitoring for the at least one malfunction.

18. A method, comprising:
   displaying, by a display of a head-up display (HUD) system, display images as displayed images, wherein HUD system comprises the display, a combiner, and at least one processor, wherein one or more of the at least one processor are communicatively coupled to at least one image sensor of at least one tracking system and to the display, wherein the one or more of the at least one image sensor is positioned on or in the combiner of the HUD system, wherein one or more of the at least one image sensor is configured to have a field of view including (a) at least one eye of the user when at least one boresight extends from the at least one eye of the user through the combiner and (b) the display;

receiving, by the combiner, the displayed images from the display;

displaying, by the combiner, the displayed images as combiner images to a user;

outputting, by the at least one processor, display image data to the display, the display image data associated with the displayed images to be displayed by the display and to be received by the combiner;

receiving, by the at least one processor, image data from the one or more of the at least one image sensor, wherein the image data is (i) for performing eye tracking and/or head tracking operations and (ii) for monitoring the displayed images;

monitoring, by the at least one processor, the displayed images for at least one malfunction, the at least one malfunction comprising at least one occurrence of: at least one symbol misalignment, at least one HUD system failure, or at least one combiner misalignment;

detecting, by the at least one processor, the at least one malfunction; and upon a detection of the at least one malfunction, at least one of (a) causing, by the at least one processor, one or more of the displayed images to be blank, have at least one blank portion, and/or have at least one blanked symbol, (b) correcting, by the at least one processor, the display image data based at least on a position of the combiner and/or a position of the user, (c) ceasing, by the at least one processor, the output of the display image data, or (d) deactivating, by the at least one processor, the display.

* * * * *